Dec. 17, 1935.   E. A. NELSON   2,024,243
BRAKE DRUM SEAL DEVICE
Filed April 20, 1934
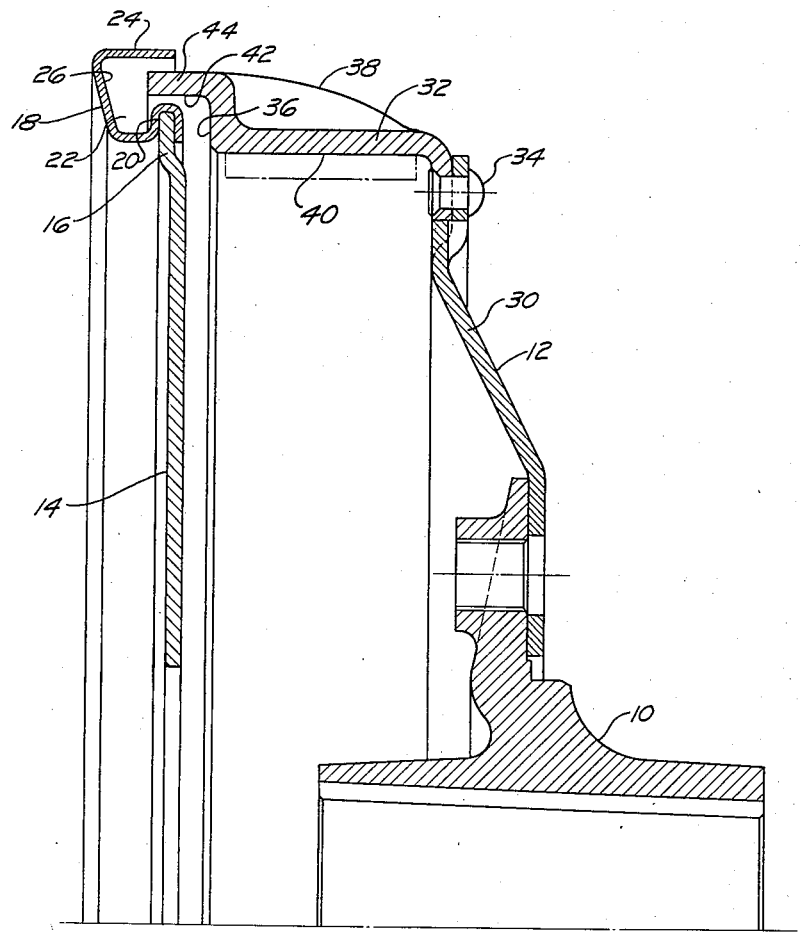
INVENTOR.
Emil A. Nelson.
BY
Harness, Dickey, Pierce & Hann,
ATTORNEYS.

Patented Dec. 17, 1935

2,024,243

UNITED STATES PATENT OFFICE 2,024,243

BRAKE DRUM SEAL DEVICE

Emil A. Nelson, Lansing, Mich., assignor to Motor Wheel Corporation, a corporation of Michigan Application April 20, 1934, Serial No. 721,435

11 Claims. (Cl. 188—218)

This invention relates to brake mechanism and particularly to that type thereof applicable for use in connection with motor vehicles, the principal object being the provision of a sealing means between a brake drum and its backing plate so constructed and arranged as to minimize the possibility of dirt, water or other foreign matter from finding its way into the interior of the brake drum and into contact with the braking surface thereof.

Objects of the invention include the provision of a sealing means between a brake drum and its backing plate that is simple in construction, efficient in operation and economical to produce; the provision of a sealing means between a brake drum and its backing plate including parts so constructed and arranged as to provide a devious path between the interior and the exterior of the brake drum through which foreign matter must pass in finding its way from the exterior of the brake drum to the interior braking surface thereof; and the provision of a free running seal between the brake drum and its backing plate so constructed and arranged as to minimize the possibility of foreign matter gaining access to the braking surfaces within the drum whether the drum is rotating or stationary.

Further objects include the provision of a seal between a brake drum and its backing plate including a sealing element embracing the peripheral margin of the backing plate and extending into protecting relation with respect to the outer edge of the drum; the provision of a seal between a brake drum and its backing plate including a sealing element embracing the radially outer margin of the backing plate radially inwardly of an axially extending inner surface of the drum and extending into sealing relation outwardly with respect to another axial surface of the drum; the provision of a seal between a brake drum and its backing plate including an outwardly stepped surface at the free edge of the drum and a sealing element secured to the margin of the backing plate within the stepped area of the drum and extending into spaced but encompassing relation with respect to the free edge of the drum; and the provision of a seal for use between a brake drum and its backing plate including a sheet metal element of annular formation providing a pair of adjacent and oppositely radially directed channels in one of which the radially outer margin of the backing plate is adapted to be closely embraced and the other of which is provided with an axially projecting flange portion in hooded relation thereto.

The above being among the objects of the present invention, the same consists in certain novel features of construction and combinations of parts to be hereinafter described with reference to the accompanying drawing, and then claimed, having the above and other objects in view.

In the drawing the single figure is a fragmentary, sectional view taken through the axis of a brake drum and its cooperating backing plate, showing a sealing means cooperating therebetween.

Modern types of brakes for motor vehicles are usually of the internal brake type, that is, those in which the braking surfaces of the drum are disposed on the inner side thereof. The open sides of such drums are conventionally closed by a disc-like plate, usually of sheet metal, which not only serves in a measure to protect the brake mechanism within the drum from direct contact with foreign matters such as dust, dirt and water, but also to provide a support for the brake mechanism within the drum and to transmit the braking torque between the drums and chassis parts of the vehicle. It is well understood that, as far as is conveniently possible, the entrance of dust, dirt, water or other foreign matter to the interior of the drum and to its braking surfaces should be minimized as much as possible in order to reduce the wear on the braking surface and to insure proper and free movement of the brake mechanism within the drum. It has been proposed heretofore to so vary the configuration of the co-acting edges of the backing plate and the brake drum, or to provide a separate member at or adjacent the cooperating edges of one or the other thereof so that any such foreign matter will have to travel a devious path in finding its way into the interior of the brake drum. It is to this general class of devices that the present invention relates.

Referring to the drawing, there is illustrated at 10 a wheel hub which may be of any desired or conventional construction. A brake drum indicated generally at 12 is secured to the hub 10 in any desired or conventional manner, and in the broader aspects of the present invention at least the particular construction and/or configuration of the brake drum 12 is more or less unimportant. A backing plate 14, preferably formed of sheet metal, is indicated in its conventional position at the open end of the drum 12, it being understood that the backing plate 14 in accordance with conventional practice is suitably fixed to a suitable non-rotating part of a motor vehicle such, for instance, as an axle housing (not shown).

Although not essential to the practice of the present invention in its broader aspect, the peripherally outer margin of the backing plate 14 is preferably offset from the plane of the main portion of the backing plate 14 as at 16, this not only serving to add rigidity to the backing plate 14 itself but in cases where the question of clearance between the inner surface of the outer margin of the backing plate and a radially extending surface of the drum is important, or for other reasons it acts to offset the thickness of the sealing member, hereinafter described, on its inner face which would otherwise be apparent.

The sealing member which is indicated generally as at 18, is of annular formation and preferably formed of sheet metal to provide a radially inwardly opening channel 20 which closely embraces the outer margin of the backing plate 14, an adjacent radially outwardly opening channel 22, preferably of larger dimensions than the channel 20 and one side of which projects in a generally radially outward direction to a point radially beyond the outer edge of the open end of the brake drum 12 where it is provided with a generally axially extending flange, leg or portion 24 extending over the radially outer edge of the open end of the drum 12 in generally spaced and overlapping relation with respect thereto and serving as a hood for the channel 22. It will thus be noted that the bottom of the channel 22 together with the left hand wall thereof as viewed in the figure and the portion 24 cooperate to form an additional channel 26 opening axially of the brake drum 12 and freely receiving the free edge of the brake drum therein.

It will thus be seen that with the construction thus far described any foreign matter finding its way into the sealing element 18 must pass axially between the portion 24 thereof and the free edge of the brake drum 12. Should such foreign material find its way into the lower part of the sealing element 18, that is the part positioned closest to the ground with respect to the axis thereof, its natural tendency under the force of gravity and centrifugal effects of the vehicle of which the mechanism forms a part in rounding curves will be to find its way back to the outside air along the same path through which it entered. Any such foreign matter that may find its way between the portion 24 of the sealing element 18 and the brake drum 12 above the center of the wheel will tend to fall by gravity into the channel 22 and be conducted thereby to the lower part of the seal from which it will be discharged in the manner heretofore described. Inasmuch as the clearance between the free edge of the brake drum and the encompassing portion of the sealing member 18 radially disposed with respect thereto is preferably maintained at the smallest dimensions commensurate with a freely spaced relation between the parts under usual manufacturing tolerances of the parts involved, it will be apparent that the possibility of any such foreign material finding its way into the interior of the drum is materially minimized.

As previously mentioned, in the broader aspects of the present invention the particular construction of the brake drum 12 is more or less immaterial so long as the results heretofore described are obtainable therewith. In the particular construction of the brake drum 12 shown the drum comprises a disc-like supporting portion 30, preferably formed of sheet metal, and a separately formed rim or ring portion 32 which may be formed of the same or different metal and suitably secured thereto as by means of rivets 34 or other suitable means.

In accordance with a further refinement of the present invention, regardless of whether the brake drum 12 is of the composite structure shown or otherwise formed, the free edge of the rim or ring portion 32 is preferably stepped to provide a radially outer surface 36 extending outwardly from the outer edge of the brake surface 40 and joining at its radially outer edge the axially extending outwardly stepped surface 42. The result of this construction is that the free edge of the brake ring 32 is formed to provide a radially outwardly offset ring or tongue 44 projecting into the channel 26. Preferably a plurality of axially disposed circumferentially spaced ribs 38 are provided between the tongue portion 44 and the main body of the brake ring to enhance the strength thereof and to increase the rate of heat transfer therefrom to the surrounding air. The addition of the tongue 44 provides, in addition to the sealing surfaces heretofore described, an additional labyrinthal path through which foreign matter must pass in finding it way into the interior of the drum as provided between the surface 36 and the opposed surface of the wall of the channel 20 which embraces the periphery of the backing plate 14. With this construction any foreign matter which might for any reason be projected from the channel 26 through the space between the portion 44 of the brake drum and the bottom wall of the channel 20 would impinge against the surface 36 where it would be subjected to the centrifugal force of the brake drum during rotation and which would thus tend to return it to the interior of the channel 26.

It may be noted at this point that the amount of offset of the outer edge 16 of the backing plate 14 is substantially equal to the thickness of the metal of the sealing member 18 and that therefore the inner face of the backing plate 14 is approximately flush with the corresponding face of the inner wall member of the channel 20. Under such circumstances the surface 36 may be extended so as to be in opposed relation to both the inner face of the inner wall member of the channel 20 as well as directly opposed to a portion of the inner surface of the backing plate 14 and the clearance therebetween maintained at a minimum value.

The particular manner in which the outer margin of the backing plate 14 is caused to be embraced within the channel portion 20 of the sealing member 18 is immaterial as far as the present invention is concerned, the only requirement of the present invention being that the periphery of the backing member 14 be closely and securely embraced in the channel 20, this being not only preferable from the standpoint of insuring proper sealing relation between these parts but additionally to prevent possible rattling between them and to enhance the strength and rigidity of the backing plate 14 in general. A preferred manner of obtaining the desired embracing relationship between the backing plate 14 and sealing member 18 is disclosed in my copending application for Letters Patent of the United States for improvements in Method of Making Brake Drum Seal Devices and Assemblies, filed on even date herewith, and serially numbered 721,436.

Formal changes may be made in the specific embodiment of the invention described without departing from the spirit or substance of the broad invention, the scope of which is commensurate with the appended claims.

I claim:

1. A sealing element for a brake mechanism comprising an annular member providing radially inwardly and radially outwardly opening annular channels, the outer wall of one of said channels being extended and provided with a flange hooding the corresponding said channel.

2. A sealing element for a brake mechanism comprising an annular member providing radially inwardly and radially outwardly facing adjacent annular channels having a common wall.

3. A sealing element for a brake mechanism including an annular member providing radially inwardly and radially outwardly facing adjacent annular channels and a portion cooperating with a wall of one of said channels so constructed and arranged as to form with the bottom and a side thereof a third and axially opening channel.

4. In a brake mechanism, in combination, a backing plate, and an annular sealing element having an annular channel within which a peripheral portion of said backing plate is embraced and one side of said channel is extended reversely in radially spaced relation to said peripheral portion.

5. In a brake mechanism, in combination, a backing plate, and an annular sealing element having a radially inwardly opening annular channel in which the periphery of said backing plate is closely embraced and one side of said channel is extended radially and reversely in housing relation to said periphery.

6. In a brake mechanism, in combination, a backing plate, the radially outer margin of which is axially offset from the plane of the main body portion thereof, and an annular sealing element provided with a radially inwardly opening annular channel in which the periphery of said backing plate is embraced, the thickness of metal of said sealing element being approximately equal to the amount of offset of the peripheral edge of said backing plate.

7. In a brake mechanism, in combination, a brake drum element having a free edge at its open side, a backing plate element disposed at the open side of said drum element, and a sealing member closely embracing opposite sides of the peripheral margin of said backing plate element and extending into radially outwardly spaced housing relation with respect to said free edge.

8. In a brake mechanism, in combination, a brake drum element having a free edge at its open side, a backing plate element disposed at the open side of said drum element, and a sealing member comprising an annular member providing a pair of radially directed annular channels in one of which the marginal edge of said backing plate element is disposed and in the other of which the free edge of said brake drum element is disposed, one of said edges being closely embraced by and thereby fixed in the corresponding one of said channels.

9. In a brake mechanism, in combination, a brake drum having an outwardly stepped free edge, a backing plate located at the open end of said drum and projecting into the stepped edge thereof, and a sealing element fixed to said backing plate, said sealing element including a portion overlying an outer face of said drum and an outwardly opening channel portion extending radially inwardly beyond the peripheral edge of said backing plate.

10. In a brake mechanism, in combination, a brake drum having an outwardly stepped free edge, a backing plate located at the open end of said drum and projecting into the stepped edge thereof, and a sealing element fixed to said backing plate by embracing opposite sides of the marginal edge thereof, said sealing element including a portion overlying an outer face of said drum and an outwardly opening channel portion extending radially inwardly beyond the peripheral edge of said backing plate.

11. In a brake mechanism, in combination, a brake drum having an outwardly stepped free edge, a backing plate located at the open end of said drum and projecting into the stepped edge thereof, and a sealing element fixed to said backing plate by embracing opposite sides of the marginal edge thereof, the peripheral margin of said backing plate being axially offset by approximately the thickness of the metal of said sealing element whereby said sealing element and backing plate present approximately co-planar faces in opposed relation to one face of said stepped edge, and a part integral with said sealing element extending into spaced but overlapping relation with respect to an outer surface of said drum.

EMIL A. NELSON.